United States Patent Office 3,635,899
Patented Jan. 18, 1972

3,635,899
POLYESTERIFICATION OF 1,4- AND 1,5-DIOLS
Marvin L. Doerr and Luis R. Vizurraga, Charlotte, N.C., assignors to Fiber Industries, Inc.
No Drawing. Filed Sept. 4, 1969, Ser. No. 855,402
Int. Cl. C08g 17/01
U.S. Cl. 260—75 M                         5 Claims

ABSTRACT OF THE DISCLOSURE

There is provided a novel process for the production of a polyester wherein the production of undesired cyclic by-products is minimized. In said process a mixture comprised of at least one 1,4- or 1,5-diol and a dicarboxylic-acid ester is subjected to a temperature of about 140 to about 230 degrees centigrade and a vacuum of from about 15 to about 760 millimeters of mercury absolute for from about 30 to about 200 minutes, a vacuum of less than about 15 millimeters of mercury is then slowly imposed upon it, and thereafter the temperature of the mixture is raised to from about 230 to about 300 degrees centigrade; and the mixture is maintained under these temperature and pressure conditions until a polymer with the desired relative viscosity is formed.

This process minimizes the amount of cyclic by-products produced.

---

This invention relates to an improved process for the production of a polyester wherein the production of undesired cyclic by-product is minimized.

Processes for the production of polymers by the condensation of dibasic carboxylic acid esters and glycols and the polymerization of the "monomer" which is produced are well known to the art. These processes, however, use either a high mole ratio of glycol/ester and/or a high reaction temperature in order to obtain economical reaction times (see, e.g., column 1 of U.S. Pat. 2,932,625). The use of either of said high mole ratio and/or said high reaction temperature is especially undesirable when the glycol reactant is a 1,4- or 1,5-diol, for these glycols undergo very rapid side reactions involving the formation of very stable 5- and 6-membered ring compounds. With, e.g., 1,4-butanediol, the side reaction leads to the production of tetrahydrofuran. These reactions are illustrated below:

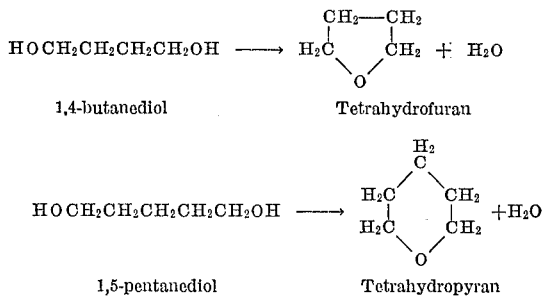

It is an object of this invention to provide a process for the production of a polyester wherein a 1,4- or 1,5-diol is condensed with a bifunctional carboxylic acid ester wherein a relatively short reaction time is involved, and, wherein neither large excesses of glycol nor high temperatures are used.

Applicants have discovered that, surprisingly, under the relatively mild conditions of the process of their invention they can form said polyester by the condensation of a 1,4- or 1,5-diol with a dicarboxylic acid ester in a relatively short period of time and with only minimal formation of undesired cyclic by-products; the process parameters described hereinbelow are critical in achieving this result.

In accordance with applicants' invention, there is provided a process for the production of a polyester wherein a lower dialkyl ester of a dicarboxylic acid is condensed with at least one diol selected from the group consisting of 1,4- and 1,5-diols in the presence of a catalyst, comprising the steps of:

(1) Subjecting a mixture comprised of said diol and said dicarboxylic acid ester to a temperature of from about 140 to about 230 degrees centigrade and a vacuum of from about 15 to about 760 millimeters of mercury absolute for from about 30 to about 200 minutes;

(2) Thereafter slowly imposing a vacuum of less than about 15 millimeters of mercury absolute on said reaction mixture;

(3) At least 5 minutes after commencing to impose said vacuum of less than 15 millimeters of mercury, raising the temperature of said mixture to from about 230 to about 300 degrees centigrade; and (4) Thereafter maintaining said mixture under said temperature and pressure conditions for a period of time sufficient to form a polymer with the desired relative viscosity.

The lower dialkyl ester of almost any dicarboxylic acid will work in the process of this invention. These esters may be made by the reaction of a dicarboxylic acid with an alcohol of the formula ROH wherein R is lower alkyl of from 1 to about 8 carbon atoms. It is preferred to form esters wherein R contains from about 1 to about 4 carbon atoms, and it is even more preferred to form esters wherein R contains 1 carbon atom.

Some of the dicarboxylic acid esters which work in the process of this invention include, e.g., aliphatic dicarboxylic acids of the formula

$$HOOC-(CH_2)_n-COOH$$

wherein $n$ is from 0 to about 10 such as oxalic acid, malonic acid, succinic acid, glutaric acid, adipic acid, pimelic acid, suberic acid, azelaic acid, sebacic acid, isosebacic acid, and the like; aromatic carboxylic acids of from about 8 to about 18 carbon atomss such as terephthalic acid, phthalic acid, isophthalic acid, diphenic acid, 2,6-naphthalenedicarboxylic acid, 3-nitrophthalic acid, 1,4-napththalenedicarboxylic acid, 4,4' - dicarboxyphenyl, bis(4-carboxyphenyl)sulfone, and the like; "dimer acids," i.e., those acids containing a plurality of carboxyls which result through Diels-Alder ethylenic reaction of drying oil acids such as linoleic acid or linolenic cadi; alicyclic dicarboxylic acids of from about 6 to about 12 carbon atoms such as trans-1,2-cyclobutanedicarboxylic acid, 1, 2-cyclopentanedicarboxylic acid, etc.; unsaturated dicarboxylic acids of from about 4 to about 18 carbon atoms such as maleic acid, fumaric acid, and the like; hydroxy aromatic dibasic acids of the formula

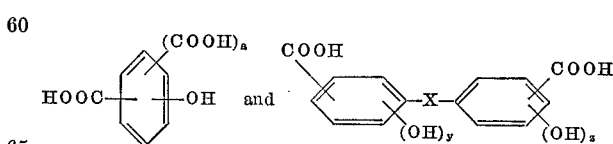

wherein $a$, $y$, and $z$ are either 0 or 1, at least one of $y$ and $z$ being 1, and $x$ is either a direct bond between the two benzene rings or is selected from the group consisting of $-(CH_2)_y-(CH_2)_z-$ wherein R is hydrogen or alkyl of 1 to about 18 carbon atoms,

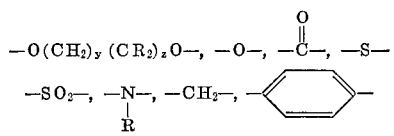

and

—RC=CR— as exempliefid by such acids as 4-hydroxybenzoic acid,
2-hydroxyterephthalic acid,
5-hydroxyisophthalic acid,
6-hydroxyisophthalic acid,
3-hydroxyphthalic acid,
4-hydroxyphthalic acid,
bis(4-carboxy-2-hydroxyphenyl)methane,
1,1-bis(4-carboxy-2-hydroxyphenyl)ethane,
2,2-bis(4-carboxy-3-hydroxyphenyl)propane,
bis(3-carboxy-4-hydroxyphenyl)sulfone,
bis(4-carboxy-3-hydroxyphenyl)sulfone,
bis(3-carboxy-4-hydroxyphenyl)sulfide,
bis(4-carboxy-3-hydroxypehnyl)sulfide,
4,4'-dicarboxy-3,3'-dihydroxybiphenyl, and the like; dicarboxylic acids having elements other than carbon, hydrogen, or oxygen such as 5-sodium sulfoisophthalic acid, 3,5-dicarboxybenzylsulfonic acid, and the like; and other dicarboxylic acids such as hexahydroterephthalic acid, 2,8 - dibenzofurandicarboxylic acid, 1,4-bicyclo(2.2.2)octanedicarboxylic acid, etc.

The preferred esters are the lower alkyl esters of phthalic acid. These are of the formula

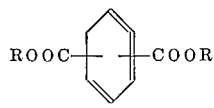

wherein R is alkyl of from 1 to about 8 carbon atoms, preferably from 1 to about 4 carbon atoms. The most preferred ester is the dimethyl ester of terephthalic acid, dimehyl terephthalate.

This process works especially well with 1,4- and 1,5-diols of the formulae

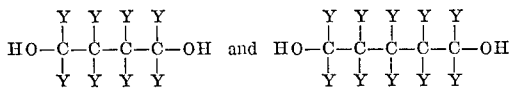

wherein Y is selected from the group consisting of hydrogen, halogen, alkyl of 1 to about 18 carbon atoms, aryl of from 6 to about 18 carbon atoms, aralkyl of up to about 30 carbon atoms, substituted alkyl of from 1 to about 18 carbon atoms wherein the substituents are selected from the group consisting of fluorine, chlorine, bromine, and iodine, and substituted aryl of from 6 to about 18 carbon atoms wherein the substituents are as hereinbefore described. The preferred class of diols are those wherein Y is alkyl or substituted alkyl and the sum of the carbon atoms in the Y substituent does not exceed 30. An even more preferred class of diols is of the formula

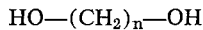
HO—(CH$_2$)$_n$—OH wherein $n$ is a number from 4 to 7 inclusive. The most preferred diols are selected from the group consisting of 1,4-butanediols and 1,5-pentanediols.

Some of the preferred diols which work well in the process of this invention include, e.g., 1,4-butanediol,
1,4-pentanediol,
1,4-decanediol,
2,5-hexanediol,
3,6-octanediol,
4,7-decanediol,
2-methyl-1,4-pentanediol,
2,2,4-trimethyl-1,4-pentanediol,
2,5-dimethyl-2,5-hexanediol,
3,6-dimethyl-3,6-octanediol,
5,6-dimethyl-4,7-decanediol,
cis or trans-1,4-($\alpha,\alpha,\alpha',\alpha'$-tetramethyl)-cyclohexanedimethanol,
1,4-diphenyl-1,4-butanediol,
3,4-diphenyl-2,6-hexanediol,
1,1,4,4-tetraphenyl-1,4-butanediol,
1,2-acenaphthenedimethanol,
1,5-pentanediol,
1,5-hexanediol,
1,5-decanediol,
2,6-heptanediol,
3,7-nonanediol,
3-mehyl-1,5-pentanediol,
2,2-dimethyl-1,5-pentanediol,
2,4,6,8-tetramethyl-3,7-nonanediol,
2,2,3,3,4,4-hexafluoro-1,5-pentanediol,
2,4-dimethyl-2,4-bis(ethoxymethyl)-1,5-pentanediol,
3,5-dimethyl-3,5-bis(methoxymethyl)2,4-heptanediol,
1,5-diphenyl-1,5-pentanediol,
3,3-diphenyl-1,5-pentanediol,
2,4-dimethyl-1,5-diphenyl-1,5-pentanediol,
1,3,5-triphenyl-1,5-pentanediol,
1,1,5,5-tetraphenyl-1,5-pentanediol,
3-($\alpha$-naphthyl)-1,5-pentanediol, and
2,4-di($\beta$-naphthyl)1,5-pentanediol.

The ester-interchange and polycondensation catalysts of the prior art may be used in the process of this invention. Although two separate catalysts may be used, one for ester interchange and one for polycondensation, it is preferred to use one catalyst for both functions. Thus, e.g., some of the many catalysts which can be used in the process of this invention include those described in U.S. Pats. 2,534,028; 2,650,213; 2,850,483; 2,892,815; 2,937,160; 2,998,412; 3,110,693 3,142,773; and 3,385,830. This list is merely exemplary, and virtually any good ester interchange and polycondensation catalyst will work in applicants' process.

The process of this invention works especially well with titanium-containing catalysts such as, e.g., those described in U.S. Pats. 2,720,502; 2,729,618; 2,882,348; 2,906,307; 3,047,515; 3,056,817; 3,056,818; 3,067,178; 3,068,204; 3,075,952; and the like. With some titanium-catalysts very low mole ratios of diol/acid and very low temperatures can be used and notwithstanding the use of these conditions, very short reaction times are obtained. In some cases the process of this invention reduces the amount of cyclic by-product formed to about two percent of that amount formed by prior art processes.

In one of the preferred embodiments of this invention the glycol is 1,4-butanediol and the ester is dimethyl terephthalate. For the sake of convenience, the invention will be described with regard to the aforementioned reactants, it being understood that the reaction conditions discussed are applicable to any of the reactants mentioned.

The reaction mixture is comprised of 1,4-butanediol and dimethyl terephthalate. It is preferred to work with a low butanediol/terephthalate mole ratio of from about 1.1 to about 2.25. A more preferred mole ratio is from about 1.2 to about 1.4, and the most preferred mole ratio is about 1.3.

To form the reaction mixture, dimethyl terephthalate may be added to butanediol. One may, prior to said addition, preheat the 1,4-butanediol to a temperature of from about 100 to about 170 degrees centigrade, although it is preferred to preheat said diol to a temperature of from about 120 to about 150 degrees centigrade. Thereafter the dimethyl terephthalate may be added.

The reaction mixture may be pre-heated up to a temperature of from about 140 to about 175 degrees centigrade, although it is preferred to pre-heat it to a temperature of from about 150 to about 170 degrees centigrade, and it is most preferred to pre-heat it to a temperature of from about 160 to 165 degrees centigrade. After it has reached the desired temperature, from about 0.01 to about 0.5 percent (by weight of dimethyl terephthalate) of an ester interchange catalyst may be added to the reaction mixture. It is preferred that the ester interchange catalyst also be effective as a polycondensation catalyst so that addition of another catalyst will not be necessitated when the ester-interchange reaction is over. When using some of the more effective catalysts of the art, one need only use from about 0.6 to about 0.1 percent thereof in applicants' process.

The reaction mixture, in the presence of a catalyst, is subjected to a temperature of from about 140 to about 230 degrees centigrade and a vacuum of from about 15 to about 760 millimeters of mercury absolute for from about 30 to about 200 minutes. "Ester-interchange" occurs during this period of time. It is preferred to subject the reaction mixture to a temperature of from about 140 to about 175 degrees centigrade and a vacuum of from about 40 to about 175 millimeters of mercury absolute for from about 75 to about 105 minutes. It is even more preferred, especially when the reaction mixture is comprised of 1,4-butanediol and dimethyl terephthalate, to subject the reaction mixture to said conditions for from about 85 to about 95 minutes. In the most preferred embodiment, the reaction mixture is subjected to a vacuum of about 75 millimeters of mercury absolute and a temperature of about 165 degrees centigrade for about 90 minutes. The reaction mixture may be heated first and then subjected to vacuum, subjected to vacuum and then heated, or subjected to vacuum and heat simultaneously. The reaction time referred to above is calculated from the time when the reaction mixture is subjected to either one or both of the reaction conditions.

After the reaction mixture has been subjected to the aforementioned conditions for the specified period of time, the vacuum may be released so that various additives, such as e.g., delustrants like titanium dioxide and aluminum oxide, optical brightening agents, and dye-site producing agents, may be added to the reaction mixture. Additionally, if the ester interchange catalyst used does not function well as a polycondensation catalyst, a suitable polycondensation catalyst may be added to the mixture. It is preferred to release vacuum at this point, although one may operate without releasing vacuum.

After the reaction mixture has been subjected to the aforementioned temperature and pressure conditions for up to about 200 minutes, a vacuum of less than about 15 millimeters of mercury absolute is slowly imposed on the reaction mixture. It is preferred to slowly impose a vacuum of from about 0.05 to about 5 millimeters of mercury absolute on the reaction mixture over a period of from about 20 to about 80 minutes, and it is even more preferred to impose a vacuum of from about 0.1 to about 2 millimeters of mercury over a period of time of from about 20 to about 80 minutes. In the most preferred embodiment, an absolute pressure of from about 0.1 to about 0.4 millimeters of mercury is imposed on said reaction mixture over a period of time of from about 45 to about 60 minutes. Prior to the time said vacuum is imposed, the temperature of the reaction mixture may be increased rapidly from to about 150 to about 250 degrees centigrade, although it is preferred to increase said temperature to from about 175 to about 200 degrees centigrade, and it is even more preferred to have said temperature be increased to from about 190 to about 200 degrees centigrade.

At least 5 minutes after commencing to impose said vacuum of less than 15 millimeters of mercury on the reaction mixture, the temperature of the reaction mixture is raised to from about 230 to about 300 degrees centigrade. It is preferred to raise said temperature from about 5 to about 80 minutes after the vacuum has started to be imposed upon the reaction mixture, and it is preferred that the reaction mixture be raised to a temperature of from about 245 to about 265 degrees centigrade. It is even more preferred to raise the reaction mixture to a temperature of from about 250 to about 260 degrees centigrade, and it is most preferred to raise it to a temperature of about 255 degrees centigrade. The reaction mixture is held at this temperature and under the aforementioned pressure for a period of time sufficient to form the desired polymer. Generally the reaction is stopped when the reaction mixture has the desired relative viscosity, the desired relative viscosity being determined by, inter alia, the properties desired in the polymer, the reactants used, etc. When 1,4-butanediol and dimethyl terephthalate are the reactants, the reaction is stopped when the reaction mixture has a relative viscosity of from about 10 to about 75, although it is preferred to halt the reaction when a relative viscosity of from about 18 to about 45 is obtained, and it is even more preferred to halt the reaction when a relative viscosity of from about 22 to about 36 is obtained.

"Relative viscosity" is a measure of the degree of polymerization of the polymer and is the ratio of the viscosity of an eight percent solution (8 grams of polymer dissolved in 100 milliliters of freshly distilled orthochlorophenol at a temperature of 100 degrees centigrade) to the viscosity of freshly distilled ortho-chlorophenol, per se, measured in the same units at 25 degrees centigrade.

As long as a 1,4- or 1,5-diol is used as a reactant, applicants' process works well in suppressing the conversion of said diol to a cyclic ether. Thus, e.g., applicants' process works well when a mixture of diols comprised of a 1,4-or 1,5-diol is condensed with one or more dicarboxylic acid esters; when such mixture is used it is preferred that it be comprised of diols selected from the group consisting of 1,4- and 1,5-diols. Thus, e.g., applicants' process works well when a 1,4- or 1,5-diol is condensed with a mixture of dicarboxylic acid esters.

The polymers produced by the process of this invention are useful for the production of films, fibers, shaped articles, molding powders, coatings, plasticizers, laminates, lubricants, and waxes.

The following examples illustrate certain preferred embodiments of applicants' invention. Unless otherwise noted, all parts are by weight and all temperatures are in degrees centigrade.

EXAMPLE 1

In one method, 81.5 parts of 1,4-butanediol, 100 parts of dimethyl terephthalate, and 0.15 parts of zinc acetate ester interchange catalyst are charged to a stainless steel reactor equipped with a thermocouple, a stirring motor, and a rectification column, thereby forming a reaction mixture wherein the diol/dimethyl terephthalate mole ratio is 1.75. This reaction mixture, at atmospheric pressure, is stirred as the temperature thereof is gradually raised from 150 degrees centigrade (at which point the reaction commences) to 225 degrees centigrade over a period of 120 minutes, during which time distillates are collected and the mixture is stirred. Then the rectification column is replaced by a total condenser, 0.06 parts of zinc oxide polycondensation catalyst are added, and the temperature of the reaction mixture is raised to 250 degrees centigrade. After the temperature of the reaction mixture is 250 degrees centigrade, an absolute pressure of 0.1 millimeters of mercury is imposed as quickly as possible without subliming the "monomer;" this vacuum is imposed over a period of 60 minutes. Polymerization is allowed to continue for a period of about 2 additional hours, yielding a polymer with a number average molecular weight of about 16,000 and a relative viscosity of 23.

Separate analyses of the distillates including those in the liquid nitrogen vacuum traps, collected during the ester interchange and polycondensation reactions indicate the total presence of 10.5 parts of tetrahydrofuran. Thus, 16.1 percent of the 1,4-butanediol charged is converted to tetrahydrofuran.

EXAMPLE 2

In applicants' method, 81.5 parts of 1,4-butanediol, 100 parts of dimethyl terephthalate, and 0.20 part of zinc acetate ester interchange catalyst are charged to a stainless steel reactor with a thermocouple, a stirring motor, and a rectification column, thereby forming a reaction mixture wherein the diol/dimethyl terephthalate ratio is 1.75. The reaction mixture is subjected to a temperature of 165 degrees centigrade and an absolute pressure of 75 millimeters of mercury for 90 minutes, during which time distillates are collected and the mixture is stirred. Then the vacuum is released, the rectification column is replaced by a total condenser, 0.10 parts of zinc oxide polycondensation catalyst are added, and an absolute pressure of 0.1 millimeters of mercury is imposed gradually over a period of time of 30 minutes while the temperature of the reaction mixture is maintained at 150 degrees centigrade. As soon as the aforementioned pressure is reached, the temperature of the reaction mixture is raised to 250 degrees centigrade. Polymerization is allowed to continue for a period of 90 additional minutes, yielding a polymer with a number average molecular weight of about 22,000 and a relative viscosity of 36.

Separate analyses of the distillates, including those in the liquid nitrogen vacuum traps, collected during the ester interchange and polycondensation reaction indicate the total presence of only 2.0 parts of tetrahydrofuran. Thus, only 3.1 percent of the 1,4-butanediol charged is converted to tetrahydrofuran.

EXAXMPLE 3

81.3 parts of 1,5-pentanediol and 100 parts of dimethyl terephthalate are reacted substantially in accordance with the procedure described in Example 2. Separate analyses of all the distillates collected during the ester interchange and polycondensation reactions indicate the total presence of less than 3.0 parts of tetrahydropyran. Thus, less than 4.5 percent of the 1,5-pentanediol charged is converted to tetrahydropyran.

EXAMPLE 4

The procedure of Example 2 is followed with the exceptions that an organo-titanium catalyst is used; the total reaction time for the polycondensation reaction is 1.5 hours. A polymer with a number average molecular weight of about 18,500 and a relative viscosity of 29 is obtained. Separate analyses of all the distillates collected during the ester interchange and polycondensation reaction indicate the presence of 1.1 parts of tetrahydrofuran. Thus, only 1.7 percent of the 1,4-butanediol charged is converted to tetrahydrofuran.

EXAMPLE 5

The procedure of Example 4 is followed, with the exception that the initial reaction temperature during polycondensation was 175 degrees centigrade, the total reaction time for the polycondensation reaction is 1.8 hours and the mole ratio of diol/dimethyl terephthalate is 1.4. A polymer with a number average of about 20,500 and a relative viscosity of 32 is obtained. Separate analyses of all the distillates collected during the ester interchange and polycondensation reactions indicate the presence of only 0.64 parts of tetrahydrofuran. Thus, only 1.2 percent of the 1,4-butanediol charged is converted to tetrahydrofuran.

EXAMPLE 6

The procedure of Example 4 is followed with the exception that the reaction temperature during the ester interchange reaction is 170 degrees centigrade, the total reaction time for the polycondensation reaction is 2.3 hours, the diol/dimethyl terephthalate molar ratio is 1.3, and the initial polycondensation reaction temperature is 190 degrees centigrade. A polymer with a number average of about 18,500 and a relative viscosity of 28 is obtained.

Separate analyses of all the distillates collected during the ester interchange and polycondensation reactions indicate the presence of only 1..2 parts of tetrahydrofuran. Thus, only 2.4 percent of the 1,4-butanediol charged is converted to tetrahydrofuran.

When other 1,4- and 1,5-diols and other dicarboxylic acid esters are used, similarly good results are obtainable. Also, when other catalyst systems are used, similarly good results are obtainable; the benefits of this invention—the reduction in the production of the undesired cyclic by-products are produced with virtually any of the catalyst systems known.

While this invention has been described with respect to certain specific embodiments, it will be recognized by those skilled in the art that many variations are possible without departing from the spirit and scope of the invention.

After having disclosed the invention, what is claimed is:

1. In a process for preparing a polyester comprising the steps of condensing a lower dialkyl ester of a dicarboxylic acid with at least one glycol selected from the group consisting of 1,4- and 1,5-diols in the presence of at least one catalyst, the improvement which comprises:

(a) subjecting a mixture comprised of said diol and said dicarboxylic acid ester to a temperature of from about 140 to about 175 degrees centigrade and a vacuum of from about 40 to about 175 millimeters of mercury absolute for from about 30 to about 200 minutes;

(b) thereafter slowly imposing a vacuum of less than about 15 millimeters of mercury absolute on said reaction mixture;

(c) at least 5 minutes after commencing to impose said vacuum of less than 15 millimeters of mercury, raising the temperature of said mixture to from about 230 to about 300 degrees centigrade; and (d) thereafter maintaining said mixture under said temperature and pressure conditions for a period of time sufficient to form a polymer with the desired relative viscosity.

2. The process of claim 1, wherein:

(a) said dialkyl ester of a dicarboxylic acid is of the formula

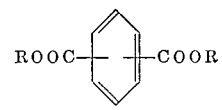

wherein R is an alkyl group of from 1 to about 8 carbon atoms; and (b) said diol is selected from the group consisting of 1,4-butanediol, 1,4-pentanediol, 1,4-decanediol, 2,5-hexanediol, 3,6-octanediol, 4,7-decanediol, 2-methyl-1,4-pentanediol, 2,2,4-trimethyl-1,4-pentanediol, 2,5-dimethyl-2,5-hexanediol, 3,6-dimethyl-3,6-octanediol, 5,6-dimethyl - 4,7 - decanediol, cis-1,4-α,α,α',α'-tetramethyl) - cyclohexanedimethanol, trans-1,4(α,α,α'α'-tetramethyl) - cyclohexanedimethanol, 1,4 - diphenyl-1,4-butanediol, 3,4-diphenyl-2,6-hexanediol, 1,1,4,4-tetraphenyl-1,4-butanediol,- 1,2-acenaphthenedimethanol, 1,5-pentanediol, 1,5-hexanediol, 1,5-decanediol, 2,6-heptanediol, 3,7-nonanediol, 3-methyl-1, 5-pentanediol, 2,2-dimethyl-1,5-pentanediol, 2,4,6,8-tetramethyl - 3,7 - nonanediol, 2,2,3,3,4,4 - hexafluoro-1,5-pentanediol, 2,4-dimethyl-2,4-bis(ethoxymethyl)-1,5-pentanediol, 3,5-dimethyl - 3,5 - bis(methoxymethyl)-2,4-heptanediol, 1,5-diphenyl-1,5-pentanediol, 3,3-diphenyl - 1,5 - pentanediol, 2,4-dimethyl-1,5-diphenyl-1,5-pentanediol, 1,3,5-triphenyl 1,5-pentanediol, 1,1,5,5-tetraphenyl-1,5-pentanediol, 3 - (α-naphthyl)-1,5-pentanediol, and 2,4-di(β-naphthyl)-1,5-pentanediol.

3. In a process for preparing a polyester comprising the steps of condensing dimethyl terephthalate with 1,4- butanediol in the presence of at least one catalyst, the improvement which comprises sequentially:
- (a) preheating a mixture comprised of said terephthalate and said diol wherein the 1,4-butanediol/dimethyl terephthalate mole ratio is from about 1.1 to about 2.25 to a temperature of from about 140 to about 175 degrees centigrade;
- (b) subjecting said mixture to a temperature of from about 140 to about 175 degrees centigrade and a vacuum of from about 40 to about 175 millimeters of mercury absolute for from about 75 to about 105 minutes;
- (c) slowly imposing an absolute pressure of from about 0.05 to about 5 millimeters of mercury on said mixture over a period of time of from about 20 to about 80 minutes; and thereafter
- (d) from about 5 to about 80 minutes after commencing to impose said absolute pressure of from about 0.05 to about 5 millimeters of mercury on said mixture, raising the temperature of said mixture to from about 245 to about 265 degrees centigrade and thereafter maintaining said mixture under said temperature and pressure conditions for a period of time sufficient to form a polymer with the desired relative viscosity.

4. The process of claim 3, wherein:
- (a) the molar ration of said 1,4-butanediol to dimethyl terephthalate is from about 1.2 to about 1.4, and said mixture is pre-heated to a temperature of from about 150 to about 170 degrees centigrade prior to the time it is subjected to vacuum;
- (b) thereafter said mixture is subjected to a vacuum of from about 40 to about 175 millimeters of mercury absolute and a temperature of from about 140 to about 175 degrees centigrade for from about 85 to about 95 minutes; and
- (c) thereafter an absolute pressure of from about 0.1 to about 2 millimeters of mercury is slowly imposed upon said mixture.

5. The process of claim 4, wherein:
- (a) said molar ration is about 1.3, and said mixture is pre-heated to a temperature of from about 160 to about 165 degrees centigrade;
- (b) thereafter said mixture is subjected to a vacuum of about 75 millimeters of mercury absolute and a temperature of about 165 degrees centigrade for about 90 minutes; and
- (c) thereafter an absolute pressure of from about 0.1 to about 0.4 millimeters of mercury is imposed upon said mixture, over a period of time of from about 45 to about 60 minutes.

References Cited

UNITED STATES PATENTS

| | | | |
|---|---|---|---|
| 2,650,213 | 8/1953 | Hofrichter | 260—75 |
| 3,050,533 | 8/1962 | Munro et al. | 260—346.1 |
| 3,336,264 | 8/1967 | Hartmann et al. | 260—75 |
| 3,377,319 | 4/1968 | Wiener | 260—75 |
| 3,390,132 | 6/1968 | Walker | 260—75 |
| 3,412,066 | 11/1968 | Schnegg et al. | 260—47 |
| 3,417,057 | 12/1968 | Heinze et al. | 260—75 |
| 3,423,281 | 1/1969 | Wiener | 161—226 |
| 3,462,395 | 8/1969 | Wiener | 260—75 |
| 3,505,293 | 4/1970 | Bond et al. | 260—75 |

FOREIGN PATENTS 828,922  2/1960  Great Britain.

OTHER REFERENCES

Marvel et al., J. Am. Chem. Soc. 72, 624 (1950).

MELVIN GOLDSTEIN, Primary Examiner

U.S. Cl. X.R.

260—22 D, 47 C, 75 H, 75 S

PO-1050
(5/69)

UNITED STATES PATENT OFFICE
CERTIFICATE OF CORRECTION

Patent No. 3,635,899      Dated Jan. 18, 1972

Inventor(s) Marvin L. Doerr et al

It is certified that error appears in the above-identified patent and that said Letters Patent are hereby corrected as shown below:

Column 2, line 45, "atomss" should be ---atoms---

Column 2, line 52, "cadi" should be --- acid---

Column 2, line 71, "-(CH$_2$)Z" should be --- -(CR$_2$)Z---

Column 3, line 40, "mehyl" should be ---methyl---

Column 4, line 14, "3-mehyl-1" should be ---3-methyl-1

Column 10, claim 5, line 2, "ration" should be ---ratio---

Signed and sealed this 26th day of November 1974.

(SEAL)
Attest:

McCOY M. GIBSON JR.
Attesting Officer

C. MARSHALL DANN
Commissioner of Patents